US012113221B2

United States Patent
Sugawara et al.

(10) Patent No.: US 12,113,221 B2
(45) Date of Patent: Oct. 8, 2024

(54) BINDER COMPOSITION FOR SECONDARY BATTERY POSITIVE ELECTRODE, CONDUCTIVE MATERIAL PASTE COMPOSITION FOR SECONDARY BATTERY POSITIVE ELECTRODE, SLURRY COMPOSITION FOR SECONDARY BATTERY POSITIVE ELECTRODE, POSITIVE ELECTRODE FOR SECONDARY BATTERY AND METHOD OF PRODUCING SAME, AND SECONDARY BATTERY

(71) Applicant: ZEON CORPORATION, Tokyo (JP)

(72) Inventors: Shinsuke Sugawara, Tokyo (JP); Naoki Takahashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 491 days.

(21) Appl. No.: 17/595,315

(22) PCT Filed: May 19, 2020

(86) PCT No.: PCT/JP2020/019818
§ 371 (c)(1),
(2) Date: Nov. 15, 2021

(87) PCT Pub. No.: WO2020/241383
PCT Pub. Date: Dec. 3, 2020

(65) Prior Publication Data
US 2022/0190341 A1 Jun. 16, 2022

(30) Foreign Application Priority Data
May 31, 2019 (JP) ................................ 2019-102593

(51) Int. Cl.
*H01M 4/62* (2006.01)
*C08F 212/10* (2006.01)
*C08F 220/42* (2006.01)
*H01M 4/02* (2006.01)
*H01M 4/04* (2006.01)
*H01M 10/0569* (2010.01)

(52) U.S. Cl.
CPC ........... *H01M 4/622* (2013.01); *C08F 212/10* (2013.01); *C08F 220/42* (2013.01); *H01M 4/0416* (2013.01); *H01M 10/0569* (2013.01); *H01M 2004/028* (2013.01)

(58) Field of Classification Search
CPC .. H01M 4/622; H01M 4/0416; H01M 4/0404; H01M 4/131; H01M 4/1391; H01M 4/624; H01M 4/139; H01M 4/62; H01M 4/621; H01M 10/0569; H01M 10/0525; H01M 10/056; H01M 10/04; H01M 10/05; H01M 10/058; C08F 212/10; C08F 212/08; C08F 220/42; C08F 236/06; C08L 33/20; C08L 101/02; C08D 125/10; C08D 125/12; C08D 201/025
See application file for complete search history.

(56) References Cited

U.S. PATENT DOCUMENTS

| | | | |
|---|---|---|---|
| 6,335,395 B1 * | 1/2002 | Sadasivan ............ | C09D 125/10 524/451 |
| 9,601,775 B2 | 3/2017 | Fukumine et al. | |
| 10,033,042 B2 | 7/2018 | Fukumine et al. | |
| 11,462,737 B2 | 10/2022 | Sonobe et al. | |
| 2013/0183550 A1 * | 7/2013 | Kourtakis ........... | H01M 50/451 429/161 |
| 2014/0178756 A1 * | 6/2014 | Ishii ....................... | H01M 4/13 429/211 |
| 2015/0050554 A1 | 2/2015 | Fukumine et al. | |

FOREIGN PATENT DOCUMENTS

| | | | |
|---|---|---|---|
| CN | 104137311 A | | 11/2014 |
| CN | 108028384 A | | 5/2018 |
| JP | 2013-008485 A | † | 1/2013 |
| JP | 2013179040 | * | 9/2013 |
| JP | 6044773 B2 | | 12/2016 |
| JP | 2017-157481 A | † | 9/2017 |
| KR | 1020140106522 A | | 9/2014 |
| WO | 2013080989 A1 | | 6/2013 |

OTHER PUBLICATIONS

Nov. 16, 2021, International Preliminary Report on Patentability issued in the International Patent Application No. PCT/JP2020/019818.
May 17, 2023, the Extended European Search Report issued by the European Patent Office in the corresponding European Patent Application No. 20813328.0.
Nov. 14, 2023, Communication pursuant to Rule 114(2) EPC issued by the European Patent Office in the corresponding European Patent Application No. 20813328.0.
Jun. 19, 2024, Communication pursuant to Article 94(3) EPC issued by the European Patent Office in the corresponding European Patent Application No. 20813328.0.

\* cited by examiner
† cited by third party

*Primary Examiner* — Matthew W Van Oudenaren
(74) *Attorney, Agent, or Firm* — KENJA IP LAW PC

(57) ABSTRACT

A binder composition for a secondary battery positive electrode contains a specific polymer. The specific polymer includes a nitrile group-containing monomer unit and a linear alkylene structural unit having a carbon number of 4 or more. The pH of an extract of the specific polymer that is obtained by a specific method is 5.5 or higher.

10 Claims, No Drawings

BINDER COMPOSITION FOR SECONDARY BATTERY POSITIVE ELECTRODE, CONDUCTIVE MATERIAL PASTE COMPOSITION FOR SECONDARY BATTERY POSITIVE ELECTRODE, SLURRY COMPOSITION FOR SECONDARY BATTERY POSITIVE ELECTRODE, POSITIVE ELECTRODE FOR SECONDARY BATTERY AND METHOD OF PRODUCING SAME, AND SECONDARY BATTERY

TECHNICAL FIELD

The present disclosure relates to a binder composition for a secondary battery positive electrode, a conductive material paste composition for a secondary battery positive electrode, a slurry composition for a secondary battery positive electrode, a positive electrode for a secondary battery and method of producing the same, and a secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery generally includes battery members such as electrodes (positive electrode and negative electrode) and a separator that isolates the positive electrode and the negative electrode from each other.

A positive electrode used for a secondary battery such as a lithium ion secondary battery generally includes a current collector and an electrode mixed material layer (positive electrode mixed material layer) formed on the current collector. The positive electrode mixed material layer is formed, for example, using a slurry composition in which a positive electrode active material, a binder composition containing a binder, and so forth are dispersed in a dispersion medium.

In order to further improve secondary battery performance, attempts have been made in recent years to improve binder compositions used in positive electrode mixed material layer formation.

In one specific example, Patent Literature (PTL) 1 discloses a binder composition for a secondary battery positive electrode containing a binder that includes a polymerization unit including a nitrile group, an aromatic vinyl polymerization unit, a polymerization unit including a hydrophilic group, and a linear alkylene polymerization unit having a carbon number of 4 or more. The binder contained in this binder composition includes the aromatic vinyl polymerization unit in a proportion of 5 mass % to 40 mass % and has a glass-transition temperature of 15° C. or lower. The binder composition disclosed in PTL 1 makes it possible to provide a binder composition that displays excellent electrolyte solution resistance, a slurry composition that displays excellent stability, and so forth.

CITATION LIST

Patent Literature

PTL 1: JP6044773B2

SUMMARY

Technical Problem

In production of a positive electrode for a secondary battery using a binder composition for a secondary battery positive electrode, the binder composition and a conductive material are mixed and used. It is necessary for the conductive material to be uniformly dispersed in the positive electrode from a viewpoint of enhancing battery characteristics of an obtained secondary battery.

However, the conventional binder composition for a secondary battery positive electrode described above leaves room for improvement in terms of increasing conductive material dispersion uniformity when mixed with a conductive material.

Accordingly, one object of the present disclosure is to provide a binder composition for a secondary battery positive electrode that can increase conductive material dispersion uniformity when mixed with a conductive material.

Another object of the present disclosure is to provide a conductive material paste composition for a secondary battery positive electrode and a slurry composition for a secondary battery positive electrode that have excellent conductive material dispersion uniformity.

Another object of the present disclosure is to provide a positive electrode for a secondary battery that can form a secondary battery having excellent battery characteristics and a method of producing this positive electrode for a secondary battery.

Another object of the present disclosure is to provide a secondary battery that has excellent battery characteristics.

Solution to Problem

The inventors made extensive studies to solve the problem set forth above. The inventors reached a new finding that a binder composition for a secondary battery positive electrode containing a polymer that includes a nitrile group-containing monomer unit and a linear alkylene structural unit having a carbon number of 4 or more and for which the pH of an extract that is extracted by a specific method is 5.5 or higher can increase conductive material dispersion uniformity well when mixed with a conductive material. In this manner, the inventors completed the present disclosure.

Specifically, the present disclosure aims to advantageously solve the problem set forth above, and a presently disclosed binder composition for a secondary battery positive electrode comprises a polymer, wherein the polymer includes a nitrile group-containing monomer unit and a linear alkylene structural unit having a carbon number of 4 or more, and an extract of the polymer has a pH of 5.5 or higher, the extract being an extract that is obtained by diluting an 8 mass % N-methyl-2-pyrrolidone solution of the polymer by a factor of 10 with deionized water. By producing a conductive material paste composition for a secondary battery positive electrode and a slurry composition for a secondary battery positive electrode through mixing of a conductive material and a binder composition for a secondary battery positive electrode that includes specific units and for which the pH of an extract obtained by a specific method is 5.5 or higher in this manner, it is possible to increase the uniformity of dispersion of the conductive material in these mixtures. Note that the phrase "includes a monomer unit" as used with respect to a polymer means that "a polymer obtained with the monomer includes a structural unit derived from the monomer". Moreover, the phrase "includes a linear alkylene structural unit" means that a polymer includes a repeating unit composed of only a linear alkylene structure represented by a general formula: —$C_nH_{2n}$— (n is an integer of 4 or more). Furthermore, the presence or absence of a monomer unit in a polymer can be determined and the proportional content of the monomer unit in the polymer can be measured by $^1$H-NMR, for example. Also, the pH of an extract of a polymer can be measured by a method described in the EXAMPLES section.

In the presently disclosed binder composition for a secondary battery positive electrode, the polymer preferably has an iodine value of not less than 3 g/100 g and not more than 60 g/100 g. When the iodine value of the polymer is within the range set forth above, heat resistance of the polymer can be increased, and high-temperature cycle characteristics of an obtained secondary battery can be enhanced.

Note that the iodine value of a polymer referred to in the present disclosure can be measured in accordance with JIS K6235(2006).

In the presently disclosed binder composition for a secondary battery positive electrode, the polymer preferably further includes an aromatic vinyl monomer unit. When the polymer includes an aromatic vinyl monomer unit, conductive material dispersion uniformity can be further increased in a situation in which the binder composition is mixed with a conductive material.

In the presently disclosed binder composition for a secondary battery positive electrode, the polymer preferably further includes a hydrophilic group-containing monomer unit. When the polymer includes a hydrophilic group-containing monomer unit, high-temperature cycle characteristics of a secondary battery obtained using the binder composition can be enhanced.

In the presently disclosed binder composition for a secondary battery positive electrode, the polymer preferably has a glass-transition temperature of higher than 15° C. When the glass-transition temperature of the polymer is higher than 15° C., conductive material dispersion uniformity can be further increased in a situation in which the binder composition is mixed with a conductive material. Note that the glass-transition temperature of a polymer can be measured by a method described in the EXAMPLES section.

In the presently disclosed binder composition for a secondary battery positive electrode, the polymer preferably has a nitric acid content of 50 ppm or less by mass. When the nitric acid content of the polymer is not more than the upper limit set forth above, high-temperature cycle characteristics of an obtained secondary battery can be enhanced. Note that the nitric acid content of a polymer can be measured by a method described in the EXAMPLES section.

Moreover, the present disclosure aims to advantageously solve the problem set forth above, and a presently disclosed conductive material paste composition for a secondary battery positive electrode comprises: a conductive material; an organic solvent; and any one of the binder compositions for a secondary battery positive electrode set forth above. The inclusion of the binder composition set forth above in this manner makes it possible to increase the uniformity of dispersion of the conductive material in the conductive material paste composition.

Furthermore, the present disclosure aims to advantageously solve the problem set forth above, and a presently disclosed slurry composition for a secondary battery positive electrode comprises: a positive electrode active material; a conductive material; an organic solvent; and any one of the binder compositions for a secondary battery positive electrode set forth above. The inclusion of the binder composition set forth above in this manner makes it possible to increase the uniformity of dispersion of the conductive material in the slurry composition.

Also, the present disclosure aims to advantageously solve the problem set forth above, and a presently disclosed positive electrode for a secondary battery comprises a positive electrode mixed material layer formed using the slurry composition for a secondary battery positive electrode set forth above on a current collector. By using a positive electrode that includes a positive electrode mixed material layer formed using the slurry composition set forth above on a current collector in this manner, it is possible to obtain a secondary battery having excellent battery characteristics such as high-temperature cycle characteristics.

Moreover, the present disclosure aims to advantageously solve the problem set forth above, and a presently disclosed method of producing a positive electrode for a secondary battery comprises a step of applying the slurry composition for a secondary battery positive electrode set forth above onto at least one side of a current collector and drying the slurry composition for a secondary battery positive electrode to form a positive electrode mixed material layer. A production method that includes this step makes it possible to efficiently produce the presently disclosed positive electrode for a secondary battery.

Furthermore, the present disclosure aims to advantageously solve the problem set forth above, and a presently disclosed secondary battery comprises a positive electrode, a negative electrode, a separator, and an electrolyte solution, wherein the positive electrode is the positive electrode for a secondary battery set forth above. This secondary battery has excellent battery characteristics such as high-temperature cycle characteristics.

Advantageous Effect

According to the present disclosure, it is possible to provide a binder composition for a secondary battery positive electrode that can increase conductive material dispersion uniformity when mixed with a conductive material.

Moreover, according to the present disclosure, it is possible to provide a conductive material paste composition for a secondary battery positive electrode and a slurry composition for a secondary battery positive electrode that have excellent conductive material dispersion uniformity.

Furthermore, according to the present disclosure, it is possible to provide a positive electrode for a secondary battery that can form a secondary battery having excellent battery characteristics and a method of producing this positive electrode for a secondary battery.

Also, according to the present disclosure, it is possible to provide a secondary battery that has excellent battery characteristics.

DETAILED DESCRIPTION

The following provides a detailed description of embodiments of the present disclosure.

The presently disclosed binder composition for a secondary battery positive electrode is for use in production of a secondary battery and can, for example, be used to produce the presently disclosed conductive material paste composition for a secondary battery positive electrode and the presently disclosed slurry composition for a secondary battery positive electrode. Moreover, the presently disclosed slurry composition for a secondary battery positive electrode can be used to form the presently disclosed positive electrode for a secondary battery. The presently disclosed positive electrode for a secondary battery includes a positive electrode mixed material layer formed using the presently disclosed slurry composition for a secondary battery positive electrode on a current collector. Moreover, the presently disclosed secondary battery includes the presently disclosed positive electrode for a secondary battery.

(Binder Composition for Secondary Battery Positive Electrode)

The presently disclosed binder composition contains a specific polymer. The specific polymer includes a nitrile group-containing monomer unit and a linear alkylene structural unit having a carbon number of 4 or more, and the pH of an extract thereof obtained by a specific method is 5.5 or higher. Consequently, the presently disclosed binder composition can increase conductive material dispersion uniformity when mixed with a conductive material. Note that the aforementioned extract is an extract that is obtained by diluting an 8 mass % N-methyl-2-pyrrolidone solution of the polymer by a factor of 10 with deionized water.

<Polymer>

The specific polymer that is contained in the presently disclosed binder composition is a component that can mainly function to increase conductive material dispersion uniformity when the binder composition is mixed with a conductive material. The polymer displays solubility in an organic solvent such as N-methyl-2-pyrrolidone that can be contained in the binder composition. Through at least some of the polymer being present in a dissolved state in the binder composition, it is possible to inhibit conductive material aggregation in a mixture that contains the binder composition and a conductive material (more specifically, in a conductive material paste composition or a slurry composition). In addition, the polymer may also function as a binder. When the polymer is said to "function as a binder", this means that in a positive electrode mixed material layer formed using a slurry composition that contains the binder composition, the polymer functions to hold components such as a positive electrode active material and a conductive material so that these components do not detach from the positive electrode mixed material layer.

The polymer is required to include a nitrile group-containing monomer unit and a linear alkylene structural unit having a carbon number of 4 or more as previously described. In addition, the polymer preferably includes either or both of an aromatic vinyl monomer unit and a hydrophilic group-containing monomer unit, and more preferably includes both an aromatic vinyl monomer unit and a hydrophilic group-containing monomer unit. The polymer may optionally include other monomer units so long as the effects disclosed herein are not lost. The polymer is preferably a hydrogenated polymer obtained by using a known method to hydrogenate a polymer that is obtained by polymerizing a monomer composition containing at least a nitrile group-containing monomer and a conjugated diene monomer.

[Nitrile Group-Containing Monomer Unit]

The nitrile group-containing monomer unit is a repeating unit that is derived from a nitrile group-containing monomer. The polymer has high solubility in an organic solvent such as N-methyl-2-pyrrolidone and can increase the viscosity of an obtained slurry composition well as a result of including the nitrile group-containing monomer unit.

Examples of nitrile group-containing monomers that can form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable, and acrylonitrile is more preferable as a nitrile group-containing monomer.

One of these nitrile group-containing monomers may be used individually, or two or more of these nitrile group-containing monomers may be used in combination.

The proportional content of the nitrile group-containing monomer unit in the polymer when all repeating units in the polymer are taken to be 100 mass % is preferably 10 mass % or more, more preferably 15 mass % or more, and even more preferably 20 mass % or more, and is preferably 45 mass % or less, more preferably 40 mass % or less, and even more preferably 35 mass % or less. When the proportional content of the nitrile group-containing monomer unit in the polymer is not less than any of the lower limits set forth above, solubility of the polymer in an organic solvent such as N-methyl-2-pyrrolidone suitably increases, and the viscosity of a conductive material paste composition or slurry composition can be suitably increased in a situation in which the binder composition is used to produce a conductive material paste composition or slurry composition. Moreover, when the proportional content of the nitrile group-containing monomer unit in the polymer is not more than any of the upper limits set forth above, conductive material dispersion uniformity can be further increased in a situation in which the binder composition is mixed with a conductive material.

[Linear Alkylene Structural Unit Having Carbon Number of 4 or More]

The linear alkylene structural unit having a carbon number of 4 or more (hereinafter, also referred to simply as the "alkylene structural unit") is a repeating unit that is composed of only a linear alkylene structure represented by a general formula: —$C_nH_{2n}$— (n is an integer of 4 or more). The polymer can increase conductive material dispersion uniformity in a situation in which the binder composition is mixed with a conductive material as a result of including the linear alkylene structural unit having a carbon number of 4 or more.

The method by which the linear alkylene structural unit is introduced into the polymer is not specifically limited and may, for example, be either of the following methods (1) or (2).

(1) A method in which a polymer is produced from a monomer composition containing a conjugated diene monomer and then the polymer is hydrogenated to convert a conjugated diene monomer unit to a linear alkylene structural unit (2) A method in which a polymer is produced from a monomer composition containing a 1-olefin monomer such as 1-butene or 1-hexene The conjugated diene monomer or 1-olefin monomer may be one monomer used individually or two or more monomers used in combination.

Of these methods, method (1) is preferable in terms of ease of production of the polymer.

Examples of conjugated diene monomers that can be used in method (1) include conjugated diene compounds such as 1,3-butadiene, isoprene, 2,3-dimethyl-1,3-butadiene, and 1,3-pentadiene. Of these conjugated diene compounds, 1,3-butadiene is preferable. In other words, the linear alkylene structural unit is preferably a structural unit obtained through hydrogenation of a conjugated diene monomer unit (i.e., is preferably a hydrogenated conjugated diene unit), and is more preferably a structural unit obtained through hydrogenation of a 1,3-butadiene unit (i.e., is more preferably a hydrogenated 1,3-butadiene unit). The hydrogenation can be performed by a commonly known method such as described further below.

The proportional content of the linear alkylene structural unit having a carbon number of 4 or more in the polymer when all repeating units (total of structural units and monomer units) in the polymer are taken to be 100 mass % is preferably 15 mass % or more, more preferably 20 mass % or more, and even more preferably 25 mass % or more, and is preferably 65 mass % or less, more preferably 55 mass % or less, and even more preferably 45 mass % or less. When the proportional content of the linear alkylene structural unit is not less than any of the lower limits set forth above, conductive material dispersion uniformity can be further increased in a situation in which the binder composition is mixed with a conductive material. Moreover, when the proportional content of the linear alkylene structural unit is not more than any of the upper limits set forth above, solubility of the polymer in an organic solvent such as N-methyl-2-pyrrolidone suitably increases, and the viscosity of a conductive material paste composition or slurry composition can be suitably increased in a situation in which the binder composition is used to produce a conductive material paste composition or slurry composition. As a result, it is possible to form a positive electrode well by using this conductive material paste composition or slurry composition and also to reduce the resistance and favorably enhance the high-temperature cycle characteristics of a secondary battery that includes this positive electrode.

Note that in a case in which the polymer is a hydrogenated polymer obtained through hydrogenation of a polymer that is obtained through polymerization of a monomer composition containing a conjugated diene as previously described, the hydrogenated polymer can include the linear alkylene structural unit and also other units derived from the conjugated diene (for example, a non-hydrogenated conjugated diene unit may be included). In this case, the total proportional content of the linear alkylene structural unit and other conjugated diene-derived units (hereinafter, also referred to as the "proportional content of conjugated diene-derived units") in the hydrogenated polymer is preferably within any of the preferred proportional content ranges that were previously described for the "proportional content of the linear alkylene structural unit". When the total proportion with the proportional content of conjugated diene-derived units is within any of the ranges set forth above, the effects described in relation to upper and lower limits for the proportional content of the linear alkylene structural unit can be displayed even better.

[Aromatic Vinyl Monomer Unit]

The aromatic vinyl monomer unit is a repeating unit that is derived from an aromatic vinyl monomer. When the polymer includes the aromatic vinyl monomer unit, conductive material dispersion uniformity can be further increased in a situation in which the binder composition is mixed with a conductive material.

Examples of monomers that can form the aromatic vinyl polymerization unit include aromatic vinyl monomers such as styrene, α-methylstyrene, and vinyltoluene. Of these monomers, styrene is preferable because of favorable copolymerizability with other monomers and relatively little side reaction such as branch, chain, or intermolecular crosslinking of the polymer.

The proportional content of the aromatic vinyl monomer unit in the polymer when all repeating units in the polymer are taken to be 100 mass % is preferably 15 mass % or more, and more preferably 20 mass % or more, and is preferably 55 mass % or less, more preferably 45 mass % or less, and even more preferably 40 mass % or less. When the proportional content of the aromatic vinyl monomer unit in the polymer is not less than any of the lower limits set forth above, conductive material dispersion uniformity can be further increased in a situation in which the binder composition is mixed with a conductive material. Moreover, when the proportional content of the aromatic vinyl monomer unit in the polymer is not more than any of the upper limits set forth above, solubility of the polymer in an organic solvent such as N-methyl-2-pyrrolidone suitably increases, and the viscosity of a conductive material paste composition or slurry composition can be suitably increased in a situation in which the binder composition is used to produce a conductive material paste composition or slurry composition.

[Hydrophilic Group-Containing Monomer Unit]

The hydrophilic group-containing monomer unit is a monomer unit that is derived from a monomer including a hydrophilic group such as an acidic group or a hydroxy group. The acidic group may be a carboxy group, a sulfo group, a phosphate group, or the like. Note that the various monomers that can be used to form the previously described nitrile group-containing monomer unit, aromatic vinyl monomer unit, and linear alkylene structural unit do not include a hydrophilic group such as a carboxy group, a sulfo group, a phosphate group, or a hydroxy group. When a polymer for which the pH of an extract obtained by a specific method is 5.5 or higher includes a hydrophilic group-containing monomer unit, characteristics of the polymer in an organic solvent such as N-methyl-2-pyrrolidone change, and this may enable good interaction between the polymer and a conductive material in a situation in which the polymer is used together with the conductive material. As a result, the uniformity of dispersion of the conductive material can be further improved. Although the reason for this is not clear, it is presumed that ionization of the hydrophilic group-containing monomer unit in the polymer in an organic solvent such as N-methyl-2-pyrrolidone results in a change in the diffusion state of the polymer in the organic solvent and interactions between the polymer and a conductive material.

Examples of carboxy group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a compound including a carboxy group.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxy ethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, and 2-hydroxypropyl methacrylate; esters of (meth)acrylic acid and polyalkylene glycol represented by a general formula $CH_2=CR^1-COO-(C_nH_{2n}O)_m-H$ (where m represents an integer of 2 to 9, n represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether and (meth)allyl-2-hydroxypropyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether and (meth)allyl-2-chloro-3-hydroxypropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The proportional content of the hydrophilic group-containing monomer unit in the polymer when all repeating units in the polymer are taken to be 100 mass % is preferably 15 mass % or less, more preferably 10 mass % or less, and even more preferably 4.5 mass % or less, and is preferably 0.1 mass % or more, and more preferably 1.0 mass % or more. When the proportional content of the hydrophilic group-containing monomer unit in the polymer is not more than any of the upper limits set forth above, conductive material dispersion uniformity can be further increased in a situation in which the binder composition is mixed with a conductive material. Moreover, when the proportional content of the hydrophilic group-containing monomer unit in the polymer is not more than any of the upper limits set forth above, close adherence to a current collector of a positive electrode mixed material layer that is formed using the binder composition can be inhibited from increasing excessively, and electrode mixed material layer uniformity can be increased, which makes it possible enhance high-temperature cycle characteristics of an obtained secondary battery. Moreover, when the proportional content of the hydrophilic group-containing monomer unit in the polymer is not less than any of the lower limits set forth above, close adherence to a current collector of a positive electrode mixed material layer that is formed using the binder composition can be increased, which makes it possible to enhance high-temperature cycle characteristics of an obtained secondary battery.

[pH of Extract]

The pH of an extract of the polymer obtained by a specific method is required to be 5.5 or higher, and is preferably 6.5 or higher, and more preferably 8.0 or higher. Moreover, the pH of the extract can be 12.0 or lower, for example, but is not specifically limited thereto. When the pH of the extract is not lower than any of the lower limits set forth above, conductive material dispersion uniformity can be increased in a situation in which the binder composition is mixed with a conductive material. Although the reason for this is not clear, it is presumed that as a result of the polymer diffusing more easily in an organic solvent, the polymer can more easily infiltrate into entanglements of the conductive material. It is also presumed that in a specific pH range, polymer that has infiltrated into entanglements of the conductive material interacts more easily with acidic functional groups that can be present at the surface of the conductive material, and thereby improves the uniformity of dispersion of the conductive material. Note that the pH of the extract of the polymer can be adjusted by altering treatment conditions in production of the polymer. More specifically, in a case in which a step of contacting with an ion exchange resin is performed in production of the polymer as described further below, the pH of the extract can be adjusted by adjusting the contact time of the ion exchange resin and the polymer, the mixing ratio of the ion exchange resin and the polymer, and so forth in the aforementioned step.

[Iodine Value]

The iodine value of the polymer is preferably 60 g/100 g or less, more preferably 40 g/100 g or less, and even more preferably 20 g/100 g or less. A polymer having an iodine value that is not more than any of the upper limits set forth above can increase the heat resistance of a positive electrode that is obtained using the binder composition. This makes it possible to enhance high-temperature cycle characteristics of an obtained secondary battery. The iodine value of the polymer can be 3 g/100 g or more, for example. In a case in which the polymer is a hydrogenated polymer, the iodine value of the polymer can be adjusted by altering the conditions in the hydrogenation reaction.

[Glass-Transition Temperature]

The glass-transition temperature of the polymer is preferably higher than 15° C., and is preferably 60° C. or lower, more preferably 40° C. or lower, and even more preferably 30° C. or lower. When the glass-transition temperature of the polymer is higher than the lower limit set forth above, conductive material dispersion uniformity can be further increased in a situation in which the binder composition is mixed with a conductive material. Moreover, when the glass-transition temperature of the polymer is not higher than any of the upper limits set forth above, the flexibility of a positive electrode mixed material layer obtained using the binder composition can be increased.

[Nitric Acid Content]

The nitric acid content of the polymer, by mass, is preferably 50 ppm or less, more preferably 30 ppm or less, even more preferably 10 ppm or less, and further preferably 1 ppm or less. When the nitric acid content in the polymer is not more than any of the upper limits set forth above, the viscosity stability of a slurry composition obtained using the binder composition can be increased. As a result, the high-temperature cycle characteristics of a secondary battery that includes a positive electrode obtained using this slurry composition can be enhanced. Moreover, the uniformity of a positive electrode mixed material layer obtained using the binder composition can be increased, and a good electrical conduction network can be formed, ultimately leading to reduction of resistance of an obtained secondary battery. The nitric acid content of the polymer originates from nitric acid or the like used in production of the polymer and can be the residual amount of nitric acid that remains without be removed in production steps.

[Production Method of Polymer]

No specific limitations are placed on the method by which the polymer described above is produced. For example, the polymer can be produced by polymerizing a monomer composition containing the monomers described above in the presence of a polymerization initiator, optional additives, and so forth to obtain a polymer, and subsequently hydrogenating the obtained polymer. The polymer that has undergone hydrogenation may optionally also be brought into contact with an ion exchange resin. Contacting with an ion exchange resin makes it possible to adjust the pH of the extract of the polymer to a desired value. The type of ion exchange resin, the conditions of treatment performed using the ion exchange resin, and so forth can be selected as appropriate depending on the chemical composition of the monomer composition used in production of the polymer, the target extract pH, and so forth. For example, in a case in which acidic adjustment is to be made, a weak acid cation exchange resin or a strong acid ion exchange resin may be used, whereas, in a case in which basic adjustment is to be made, a weak base anion exchange resin or a strong base ion exchange resin may be used. Moreover, treatment using the ion exchange resin may be performed by, for example, 1) adopting a method in which the polymer and the ion exchange resin are loaded into a vessel, are stirred for 1 hour, and are then filtered to remove the ion exchange resin, or 2) adopting a method in which the ion exchange resin is loaded into a column, and the polymer is conveyed by a pump or the like and is caused to pass through the column.

The proportional content of each monomer in the monomer composition used to produce the polymer can be set in accordance with the proportional content of each repeating unit in the polymer.

The polymerization method is not specifically limited and may, for example, be any of solution polymerization, suspension polymerization, bulk polymerization, and emulsion polymerization.

Moreover, the method of hydrogenation of the polymer is not specifically limited and can be oil-layer hydrogenation, water-layer direct hydrogenation, water-layer indirect hydrogenation (for example, refer to WO2013/080989A1, etc.), or the like, which are typical methods using a catalyst.

<Solvent>

The binder composition may contain a solvent. The solvent is not specifically limited and may be an organic solvent. Examples of organic solvents that can be used include ketones such as acetone, ethyl methyl ketone, and cyclohexanone, esters such as ethyl acetate and butyl acetate, ethers such as diethyl ether, dioxane, and tetrahydrofuran, amide polar organic solvents such as N,N-dimethylformamide and N-methyl-2-pyrrolidone (NMP), and aromatic hydrocarbons such as toluene, xylene, chlorobenzene, orthodichlorobenzene, and paradichlorobenzene. The specific polymer described above has excellent solubility in various organic solvents such as those listed above. One of these organic solvents may be used individually, or two or more of these organic solvents may be used as a mixture. Of these organic solvents, it is preferable that a solvent including at least NMP is used as the solvent, and more preferable that NMP is used by itself as the solvent from a viewpoint of handleability.

<Other Components>

Besides the components described above, the presently disclosed binder composition may contain components such as a binder that is a polymer having a different chemical composition to the polymer described above and known additives such as those described in JP6044773B2. One of these components may be used individually, or two or more of these components may be used in combination in a freely selected ratio.

The binder that is a polymer having a different chemical composition to the polymer described above may be polyacrylonitrile, polymethyl methacrylate, a fluorine-containing polymer such as polyvinylidene fluoride (PVDF), or the like, for example. Of these binders, PVDF can suitably be used from a viewpoint of reducing the resistance of an obtained secondary battery. The binder differs from the polymer described above in terms that it does not include either or both of a nitrile group-containing monomer unit and a linear alkylene structural unit having a carbon number of 4 or more or that the pH of an extract obtained from the binder by a specific method may be lower than 5.5. Note that the binder is a component that, in a positive electrode mixed material layer formed using a slurry composition that contains the binder composition, holds components such as a positive electrode active material and a conductive material so that these components do not detach from the positive electrode mixed material layer and can cause adhesion of battery members through the positive electrode mixed material layer.

<Production Method of Binder Composition>

The presently disclosed binder composition can, without any specific limitations, be obtained as a reaction liquid obtained according to the production method described above or be obtained by performing solvent exchange of a solvent contained in the reaction liquid with a desired solvent, for example. Alternatively, the binder composition can be produced by mixing the polymer obtained according to the production method described above and other optionally used components in the presence of a solvent.

(Conductive Material Paste Composition for Secondary Battery Positive Electrode)

A feature of the presently disclosed conductive material paste composition is that it contains a conductive material, an organic solvent, and the binder composition set forth above. The presently disclosed conductive material paste composition has sufficiently high uniformity of dispersion of the conductive material as a result of containing the presently disclosed binder composition.

<Conductive Material>

The conductive material is a component that can be compounded in order to promote electrical contact among an electrode active material in a positive electrode mixed material layer. The conductive material is preferably a carbon material. More specifically, conductive carbon materials such as carbon black (for example, acetylene black, Ketjenblack® (Ketjenblack is a registered trademark in Japan, other countries, or both), and furnace black), graphite, carbon fiber, and carbon flake; and fibers, foils, and the like of various metals can suitably be used as the conductive material. Of these examples, the conductive material more preferably includes carbon fiber, even more preferably includes carbon nanofiber such as carbon nanotubes or vapor-grown carbon fiber, and particularly preferably includes carbon nanotubes.

One of these conductive materials may be used individually, or two or more of these conductive materials may be used in combination.

The BET specific surface area of the conductive material is preferably 20 $m^2/g$ or more, more preferably 50 $m^2/g$ or more, and even more preferably 100 $m^2/g$ or more, and is preferably 2,000 $m^2/g$ or less, more preferably 1,500 $m^2/g$ or less, and even more preferably 700 $m^2/g$ or less. When the BET specific surface area of the conductive material is not less than any of the lower limits set forth above, good electrical conduction paths can be formed in a positive electrode mixed material layer, and initial resistance of a secondary battery can be reduced. Moreover, when the BET specific surface area of the conductive material is not more than any of the upper limits set forth above, the solid content concentration of an obtained slurry composition can be increased well. Note that the BET specific surface area of the conductive material is the nitrogen adsorption specific surface area measured using the BET method and can be measured by a method described in the EXAMPLES section.

Note that conductive materials having a large BET specific surface area and fibrous conductive materials such as carbon nanotubes normally tend to aggregate and be difficult to disperse. However, uniform and stable dispersion is possible even for a conductive material having a large BET specific surface area or a fibrous conductive material such as carbon nanotubes by using the presently disclosed binder composition.

<Organic Solvent>

Any of the various organic solvents listed as solvents that can be compounded in the presently disclosed binder composition can suitably be used. One of these organic solvents may be used individually, or two or more of these organic solvents may be used in combination in a freely selected ratio. Of these organic solvents, NMP is preferable as the organic solvent compounded in the conductive material paste composition. Note that the organic solvent contained in the conductive material paste composition also includes organic solvent that was contained in the binder composition.

<Other Components>

Examples of other components that can be compounded in the conductive material paste composition include, but are not specifically limited to, the same other components as can be compounded in the presently disclosed binder composition. One other component may be used individually, or two or more other components may be used in combination in a freely selected ratio.

<Production Method of Conductive Material Paste Composition>

The conductive material paste composition can be produced by mixing the presently disclosed binder composition set forth above, the conductive material, and other optional components such as the organic solvent. The method of mixing is not specifically limited and may be a mixing method that uses a mixer such as a ball mill, a sand mill, a bead mill, a pigment disperser, a grinding machine, an ultrasonic disperser, a homogenizer, a planetary mixer, or a FILMIX.

<Ratio of Polymer and Conductive Material in Conductive Material Paste Composition>

With regards to the content ratio of the conductive material and the polymer having the prescribed chemical composition described above in the conductive material paste composition, the content of the polymer when the content of the conductive material is taken to be 100 parts by mass is preferably 5 parts by mass or more, and more preferably 10 parts by mass or more, and is preferably 100 parts by mass or less, and more preferably 50 parts by mass or less. The solid content concentration of the conductive material paste composition can, for example, be not less than 1 mass % and not more than 25 mass %.

(Slurry Composition for Secondary Battery Positive Electrode)

The presently disclosed slurry composition is a composition that is used for forming a positive electrode for a secondary battery and contains a positive electrode active material, a conductive material, an organic solvent, and the binder composition set forth above. In other words, the presently disclosed slurry composition contains the previously described specific polymer, a positive electrode active material, a conductive material, and an organic solvent. As a result of containing the binder composition set forth above, the presently disclosed slurry composition can enhance battery characteristics of a secondary battery including a positive electrode that includes a positive electrode mixed material layer formed from the slurry composition.

<Binder Composition>

The presently disclosed binder composition set forth above, which contains the specific polymer, is used as a binder composition. The amount of the binder composition in the slurry composition is preferably an amount such that a ratio (by mass) of the positive electrode active material and the specific polymer is as described below. Specifically, the amount of the polymer in terms of solid content per 100 parts by mass of the positive electrode active material is preferably 0.05 parts by mass or more, more preferably 0.10 parts by mass or more, and even more preferably 0.15 parts by mass or more, and is preferably 2.0 parts by mass or less, more preferably 1.0 parts by mass or less, and even more preferably 0.5 parts by mass or less. When the amount of the binder composition is an amount satisfying any of the lower limit threshold values set forth above, the uniformity of dispersion of the conductive material in the slurry composition can be further increased. In addition, the resistance of an obtained secondary battery can be reduced through conductive material dispersion uniformity being further increased. Moreover, when the amount of the binder composition is an amount satisfying any of the upper limit threshold values set forth above, the resistance of a secondary battery including a positive electrode that is formed using the slurry composition can be reduced.

<Conductive Material>

The conductive material can be any of the various materials that were described as conductive materials that can be contained in the presently disclosed conductive material paste composition. Of these conductive materials, a conductive material including carbon nanotubes can suitably be used from a viewpoint of further reducing the resistance of an obtained secondary battery. The amount of the conductive material in the slurry composition is preferably not less than 0.5 parts by mass and not more than 3.0 parts by mass per 100 parts by mass of the positive electrode active material. This is because good electrical conduction paths can be formed in a positive electrode mixed material layer and the resistance of a secondary battery can be further reduced when the amount of the conductive material is within this range.

<Positive Electrode Active Material>

The positive electrode active material may be a known positive electrode active material that is used in secondary batteries. Examples of positive electrode active materials that can be used in a positive electrode mixed material layer of a lithium ion secondary battery, which is one example of a secondary battery, include transition metal-containing compounds such as transition metal oxides, transition metal sulfides, and complex metal oxides of lithium and transition metals, but are not specifically limited thereto. Examples of the transition metal include Ti, V, Cr, Mn, Fe, Co, Ni, Cu, and Mo.

Specifically, the positive electrode active material for a lithium ion secondary battery may be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a lithium-rich spinel compound represented by $Li_{1+x}Mn_{2-x}O_4$ (0<x<2), $Li[Ni_{0.17}Li_{0.2}Co_{0.07}Mn_{0.56}]O_2$, or $LiNi_{0.5}Mn_{1.5}O_4$ without any specific limitations. Examples of lithium-containing complex oxides of Co—Ni—Mn include $Li(Ni_{0.5}Mn_{0.3}Co_{0.2})O_2$ and $Li(Ni_{1/3}Mn_{1/3}Co_{1/3})O_2$.

Of the examples given above, lithium-containing cobalt oxide ($LiCoO_2$), lithium-containing nickel oxide ($LiNiO_2$), a lithium-containing complex oxide of Co—Ni—Mn, $Li[Ni_{0.17}Li_{0.2}Co_{0.07}Mn_{0.56}]O_2$, or $LiNi_{0.5}Mn_{1.5}O_4$ is preferably used as the positive electrode active material from a viewpoint of improving battery capacity and the like of a secondary battery, with the use of lithium-containing cobalt oxide ($LiCoO_2$) or a lithium-containing complex oxide of Co—Ni—Mn being more preferable.

The amount and particle diameter of the positive electrode active material may be, but are not specifically limited to, the same as those of conventionally used positive electrode active materials.

<Organic Solvent>

Any of the various organic solvents listed as solvents that can be compounded in the presently disclosed binder composition can suitably be used as the organic solvent. One of these organic solvents may be used individually, or two or more of these organic solvents may be used in combination in a freely selected ratio.

<Other Components>

Examples of other components that may be compounded in the slurry composition include, but are not specifically limited to, the same other components as may be compounded in the presently disclosed binder composition. One other component may be used individually, or two or more other components may be used in combination in a freely selected ratio. Among other components, the amount of a binder that is a polymer having a different chemical composition to the specific polymer is preferably 0.5 parts by mass or more, more preferably 1.0 parts by mass or more, and even more preferably 1.5 parts by mass or more per 100 parts by mass of the positive electrode active material, and is preferably 5.0 parts by mass or less, more preferably 4.0 parts by mass or less, and even more preferably 3.0 parts by mass or less per 100 parts by mass of the positive electrode active material. When the amount of the binder is not less than any of the lower limits set forth above, close adherence between a current collector and a positive electrode mixed material layer formed using the slurry composition can be increased. Moreover, when the amount of the binder is not more than any of the upper limits set forth above, the resistance of an obtained secondary battery can be further reduced.

<Production Method of Slurry Composition>

The slurry composition set forth above can be produced by dissolving or dispersing the components described above in the organic solvent. For example, the slurry composition can be produced by mixing the above-described components and the organic solvent by a known dispersing or mixing method such as previously described. Moreover, the slurry composition can be produced by, for example, adding the electrode active material and optional components such as described above to the presently disclosed conductive material paste composition and then performing dispersing or mixing thereof by a known method such as previously described. Although no specific limitations are placed on the order of addition of the components during production, it is preferable to perform a step of adding the electrode active material and optional components such as described above to the presently disclosed conductive material paste composition and then performing mixing thereof from a viewpoint of increasing dispersibility of the conductive material. Note that organic solvent contained in the binder composition or the conductive material paste composition may serve as the organic solvent that is used in production of the slurry composition.

(Positive Electrode for Secondary Battery)

The presently disclosed positive electrode for a secondary battery includes a current collector and a positive electrode mixed material layer disposed on at least one side of the current collector. The positive electrode mixed material layer is formed using the slurry composition for a secondary battery positive electrode set forth above. In other words, the positive electrode mixed material layer contains at least a positive electrode active material, a conductive material, and a polymer. Note that components contained in the positive electrode mixed material layer are components that were contained in the slurry composition for a secondary battery positive electrode set forth above, and the preferred ratio of these components is the same as the preferred ratio of the components in the slurry composition.

As a result of the presently disclosed positive electrode for a secondary battery being produced using a slurry composition that contains the presently disclosed binder composition for a secondary battery positive electrode, a secondary battery having excellent battery characteristics can be formed by using this positive electrode.

<Production Method of Positive Electrode>

The presently disclosed positive electrode for a secondary battery can, for example, be produced through a step of applying the slurry composition set forth above onto at least one side of the current collector (application step) and a step of drying the slurry composition that has been applied onto at least one side of the current collector to form a positive electrode mixed material layer on at least one side of the current collector (drying step).

[Application Step]

The slurry composition may be applied onto at least one side of the current collector by any commonly known method without any specific limitations. Specific examples of application methods that can be used include doctor blading, dip coating, reverse roll coating, direct roll coating, gravure coating, extrusion coating, and brush coating. It is necessary for the slurry composition to be applied onto at least one side of the current collector, but the slurry composition may be applied onto both sides of the current collector as necessary. The thickness of the slurry coating on the current collector after application but before drying may be set as appropriate in accordance with the thickness of the positive electrode mixed material layer that is to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. Of these materials, aluminum foil is particularly preferable as a current collector used for a positive electrode. One of these materials may be used individually, or two or more of these materials may be used in combination in a freely selected ratio.

[Drying Step]

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, a positive electrode mixed material layer is formed on the current collector and thus a positive electrode for a secondary battery including the current collector and the positive electrode mixed material layer can be obtained.

After the drying step, the positive electrode mixed material layer may be further subjected to a pressing process such as mold pressing or roll pressing. The pressing process can effectively increase the density of the positive electrode mixed material layer and can also improve close adherence of the positive electrode mixed material layer and the current collector. Furthermore, when the positive electrode mixed material layer contains a curable polymer, the polymer is preferably cured after the positive electrode mixed material layer has been formed.

(Secondary Battery)

The presently disclosed secondary battery includes a positive electrode, a negative electrode, an electrolyte solution, and a separator, wherein the positive electrode is the presently disclosed positive electrode for a secondary battery. The presently disclosed secondary battery has excellent battery characteristics (particularly, high-temperature cycling) as a result of including the presently disclosed positive electrode for a secondary battery.

Although the following describes, as one example, a case in which the secondary battery is a lithium ion secondary battery, the present disclosure is not limited to the following example.

<Negative Electrode>

The negative electrode may be any known negative electrode. Specifically, the negative electrode may, for example, be a negative electrode formed of a thin sheet of lithium metal or a negative electrode obtained by forming a negative electrode mixed material layer on a current collector.

The current collector may be made of a metal material such as iron, copper, aluminum, nickel, stainless steel, titanium, tantalum, gold, or platinum. The negative electrode mixed material layer may be a layer that contains a negative electrode active material and a binder. The binder is not specifically limited and may be freely selected from known materials.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used. The concentration (25° C.) of the supporting electrolyte in the electrolyte solution can be not less than 0.5 mol/L and not more than 2.0 mol/L, for example.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region, with the use of a mixture of ethylene carbonate and diethyl carbonate being preferable. An additive such as vinylene carbonate (VC), fluoroethylene carbonate, or ethyl methyl sulfone may be added to the electrolyte solution.

<Separator>

A known separator such as an organic separator may be used as the separator without any specific limitations. The organic separator is a porous member that is formed of an organic material and may, for example, be a microporous membrane or non-woven fabric containing a polyolefin resin such as polyethylene or polypropylene, an aromatic polyamide resin, or the like.

<Production Method of Secondary Battery>

The presently disclosed secondary battery may be produced, for example, by stacking the positive electrode and the negative electrode with the separator in-between, performing rolling, folding, or the like of the resultant laminate in accordance with the battery shape as necessary to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Various evaluations and measurements in the examples and comparative examples were performed by the following methods.

<pH of Extract of Polymer>

An NMP solution of a polymer A produced in each example or comparative example was adjusted to a solid content concentration of 8.0%. After adding 90 g of deionized water to 10 g of the NMP solution of the polymer A, a lab spoon was used to perform stirring and pressing, and liquid encapsulated in coagulated polymer A was extracted in a deionized water phase to obtain an extract. The pH of the extract was measured at 25° C. in accordance with JIS Z8802(2011).

<Iodine Value of Polymer>

After coagulating 100 g of a water dispersion of a polymer A or a precursor (particulate polymer) of the polymer A produced in each example or comparative example, 12 hours of vacuum drying was performed at a temperature of 60° C. The iodine value of the resultant dry polymer was measured in accordance with JIS K6235(2006).

<Mass % of Each Monomer Unit in Polymer>

After coagulating 100 g of a water dispersion of a precursor (particulate polymer) of a polymer A produced in each example or comparative example in 1 L of methanol, 12 hours of vacuum drying was performed at a temperature of 60° C. The resultant dry polymer was dissolved in deuterated chloroform to obtain a 1 mass % solution that was used to determine the content ratio of monomer units by $^1$H-NMR using a nuclear magnetic resonance spectrometer (AVANCE III 600 produced by Bruker Corporation).

<Nitric Acid Content of Polymer>

An extract was obtained from a polymer A produced in each example or comparative example by the method described in the "pH of extract of polymer" section. The obtained extract was filtered through a 0.2 μm disc-type filter, quantification of nitrous acid and nitrate ions was performed by ion chromatography (apparatus: DX500 produced by Dionex Corporation; column: AS12A and AG12A produced by Thermo Fisher Scientific; eluent: 2.7 mM $Na_2CO_3$/0.3 mM $NaHCO_3$; flow rate: 1.5 mL/min; column temperature: 35° C.; detector: UV 214 nm), and the sum thereof was taken to be the nitric acid content of the polymer.

<Glass-Transition Temperature of Polymer>

The glass-transition temperature (Tg) of a polymer A produced in each example or comparative example was measured using a differential scanning calorimeter (produced by SIT NanoTechnology Inc.; product name: EXSTAR DSC6220). Specifically, 10 mg of the produced polymer was placed in an aluminum pan as a measurement sample. An empty aluminum pan was used as a reference. The measurement sample was loaded into the differential scanning calorimeter and was measured in a temperature range of −100° C. to 200° C. (heating rate: 10° C./min) to obtain a differential scanning calorimetry (DSC) curve. The glass-transition temperature (° C.) of the polymer A was determined as a temperature corresponding to an intersection point of a baseline of the DSC curve directly before a heat absorption peak at which a derivative signal (DDSC) reached 0.05 mW/min/mg or more and a tangent to the DSC curve at a first inflection point to appear after the heat absorption peak.

<Conductive Material Dispersion Uniformity>

Evaluation of conductive material dispersion uniformity was performed through evaluation based on a value obtained by multiplying the BET specific surface area of a conductive material by the solid content concentration of a conductive material paste composition produced in each example or comparative example. An evaluation of whether or not good dispersion of a conductive material in a conductive material paste composition is possible is typically made by evaluating the value of the solid content concentration of a conductive material paste composition produced with a specific viscosity. However, since a conductive material having a higher BET specific surface area aggregates more easily and makes it more difficult to increase the solid content concentration, it is not possible to evaluate conductive material dispersion uniformity for examples and comparative examples in which conductive materials having different BET specific surface areas are used through simple comparison of solid content concentration. For this reason, the conductive material dispersion uniformity in a conductive material paste composition was evaluated based on a value (hereinafter, also referred to as "value X") of "solid content concentration of conductive material paste composition× BET specific surface area of conductive material" in the present specification with the aim of canceling out the influence of ease of dispersion of a conductive material itself, which is dependent on the BET specific surface area of the conductive material.

Conductive material dispersion uniformity was evaluated as described below for a situation in which a conductive material used in each example or comparative example was dispersed using a polymer A that was produced in that example or comparative example. The polymer A and the conductive material were compounded in the same ratio as the ratio in which they were used in production of a conductive material paste composition in each example or comparative example, an appropriate amount of NMP was further compounded, and then mixing was performed using a disper blade and a bead mill under the same conditions as in the example or comparative example to produce a conductive material paste composition as a measurement sample. The viscosity of the conductive material paste composition obtained as a measurement sample was measured using a B-type viscometer. The measurement conditions were a temperature of 25° C., a No. 4 rotor, and a rotor speed of 60 rpm. Note that the "appropriate amount of NMP" used in production of the conductive material paste composition as a measurement sample was an amount adjusted such that the viscosity was within a range of 3,300 mPa·s to 3,700 mPa·s.

A value was calculated for the solid content concentration of the conductive material paste composition serving as a measurement sample that had a viscosity within the range of 3,300 mPa·s to 3,700 mPa·s, and then this value for the solid content concentration was multiplied by a value ($m^2$/g) for the BET specific surface area of the used conductive material to calculate the value X. The calculated value X was evaluated in accordance with the following standard. A larger value X indicates that the conductive material can be present uniformly in an obtained slurry composition and that high-temperature cycle characteristics of a secondary battery that is ultimately obtained will be improved.

Note that the value for the BET specific surface area of the conductive material was measured using a BELSORP®-max (BELSORP is a registered trademark in Japan, other countries, or both) produced by Bel Japan Inc.

A: Value X of 1,100 or more
B: Value X of not less than 900 and less than 1,100
C: Value X of not less than 700 and less than 900
D: Value X of not less than 500 and less than 700

E: Value X of less than 500

<Resistance of Secondary Battery>

A secondary battery produced in each example or comparative example was constant-current charged to a battery voltage of 4.2 V at 0.2C and subsequently constant-voltage charged to a charging current of 0.02C at 4.2 V in a 25° C. environment. Next, constant-current discharging was performed to a battery voltage of 3.87 V (SOC: 50%) at 0.2C. Thereafter, the voltage change after 30 seconds of discharging was measured for each of 0.2C, 0.5C, 1.0C, 2.0C, 2.5C, and 3.0C. The discharge currents and measured voltage changes were plotted and the gradient of the plot was taken as a resistance value (a). The calculated resistance value was evaluated by the following standard. A smaller resistance value indicates that the secondary battery has better battery characteristics.

A: Resistance value of less than 4
B: Resistance value of not less than 4 S2 and less than 6 SZ
C: Resistance value of 6 S2 or more <High-Temperature Cycle Characteristics of Secondary Battery>

A secondary battery produced in each example or comparative example was subjected to three cycles of an operation of charging to 4.2 V and discharging to 3.0 V at 0.2C in a 25° C. environment. Thereafter, the secondary battery was subjected 200 cycles of an operation of charging to a battery voltage of 4.2 V at 1C and discharging to a battery voltage of 3.0 V at 1C in a 60° C. environment. A capacity maintenance rate $\Delta C(=(C1/C0)\times 100(\%))$ was calculated from the discharge capacity (C0) of the $1^{st}$ cycle and the discharge capacity (C1) of the $200^{th}$ cycle and was evaluated by the following standard. A higher capacity maintenance rate indicates a smaller decrease of discharge capacity, and thus indicates better cycle characteristics.

A: $\Delta C$ of 90% or more
B: $\Delta C$ of not less than 88.5% and less than 90%
C: $\Delta C$ of not less than 87% and less than 88.5%
D: $\Delta C$ of less than 87%

Example 1

<Production of Polymer A>

A reactor was charged, in order, with 180 parts of deionized water, 25 parts of sodium dodecylbenzenesulfonate aqueous solution of 10% in concentration, 21 parts of acrylonitrile as a nitrile group-containing monomer, 36 parts of styrene as an aromatic vinyl monomer, 4 parts of methacrylic acid as a hydrophilic group-containing monomer, and 2 parts of t-dodecyl mercaptan as a chain transfer agent. Next, gas inside the reactor was purged three times with nitrogen, and then 39 parts of 1,3-butadiene as a conjugated diene monomer capable of introducing a linear alkylene structural unit having a carbon number of 4 or more into a polymer A was charged to the reactor. The reactor was held at 10° C. while 0.1 parts of cumene hydroperoxide as a polymerization initiator and appropriate amounts of a reductant and a chelating agent were charged thereto. A polymerization reaction was continued under stirring until the polymerization conversion rate reached 85%, at which point, 0.1 parts of hydroquinone aqueous solution of 10% in concentration was added as a polymerization inhibitor to terminate the polymerization reaction. Next, residual monomer was removed at a water temperature of 80° C. to yield a water dispersion of a precursor (particulate polymer) of a polymer A. The iodine value and the mass % of each monomer unit were measured for the obtained particulate polymer as previously described.

The obtained water dispersion of the precursor and a palladium catalyst (solution obtained by mixing 1% palladium acetate acetone solution and an equivalent mass of deionized water) were added into an autoclave such that the palladium content relative to the mass of solid content contained in the water dispersion was 5,000 ppm, and a hydrogenation reaction was performed at a hydrogen pressure of 3 MPa and a temperature of 50° C. for 6 hours to yield a reaction liquid. A strong base anion exchange resin (A3000H produced by Purolite Corporation) was added to the obtained reaction liquid in the same number of parts by mass as the mass of solid content contained in the reaction liquid. These materials were stirred at room temperature (25° C.) in a shaking machine over 2 hours and were subsequently filtered through 200-mesh filter cloth to obtain a water dispersion of a target polymer A. The iodine value and the glass-transition temperature of the obtained polymer A were measured as previously described. The results are shown in Table 1. Upon comparison of the iodine value of the polymer A and the iodine value of the precursor (particulate polymer) of the polymer A measured as described above, the polymer A was confirmed to include a hydrogenated butadiene unit (i.e., a linear alkylene structural unit having a carbon number of 4) based on the iodine value of the polymer A being lower than the iodine value of the particulate polymer.

<Production of Binder Composition for Positive Electrode>

The water dispersion of the polymer A and an appropriate amount of NMP as an organic solvent were mixed. Next, water contained in the resultant mixture was completely evaporated under reduced pressure to obtain a binder composition for a positive electrode that was an NMP solution of the polymer A. This NMP solution of the polymer A was used to measure the pH of an extract of the polymer and the nitric acid content of the polymer as previously described. The results are shown in Table 1.

<Production of Conductive Material Paste Composition>

A conductive material paste composition was produced by using a disper blade to stir (3,000 rpm, 10 minutes) 1 part of multi-walled carbon nanotubes (BET specific surface area: 160 m$^2$/g) as a conductive material, a specific amount of the binder composition for a positive electrode containing 0.2 parts of the polymer A, and an appropriate amount of NMP as a solvent and subsequently using a bead mill in which zirconia beads of 1 mm in diameter were used to perform 1 hour of mixing at a circumferential speed of 8 m/s. Note that the additive amount of NMP was adjusted such that the viscosity of the obtained conductive material paste composition was 3,300 mPa·s to 3,700 mPa·s. Also note that the obtained conductive material paste composition had a viscosity of 3,400 mPa·s and had a solid content concentration of 7.9% at that viscosity. Moreover, the uniformity of dispersion of the conductive material was evaluated as previously described. The result is shown in Table 1.

<Production of Slurry Composition for Secondary Battery Positive Electrode and Production of Positive Electrode>

A slurry composition for a positive electrode was produced by adding 100 parts of a ternary active material having a layered structure (LiNi$_{0.5}$Co$_{0.2}$Mn$_{0.3}$O$_2$; average particle diameter: 10 μm) as a positive electrode active material, 2 parts in terms of solid content of polyvinylidene fluoride (PVdF) as a binder, and NMP as an organic solvent to the conductive material paste composition obtained as described above and performing stirring (60 rpm, 30 minutes) thereof in a planetary mixer. Note that the additive amount of NMP was adjusted such that the viscosity of the obtained slurry composition for a positive electrode (measured by a single cylinder rotary viscometer in accordance with JIS Z8803:1991; temperature: 25° C.; rotation speed: 60 rpm) was within a range of 4,000 mPa·s to 5,000 mPa·s.

<Production of Positive Electrode>

Aluminum foil of 20 μm in thickness was prepared as a current collector. The slurry composition for a positive electrode described above was applied onto the aluminum foil using a comma coater such as to have a coating weight after drying of 20 mg/cm'. The applied slurry composition for a positive electrode was dried at 90° C. for 20 minutes and at 120° C. for 20 minutes, and was subsequently heat treated at 60° C. for 10 hours to obtain a positive electrode web. The positive electrode web was rolled by roll pressing to produce a sheet-shaped positive electrode including the aluminum foil and a positive electrode mixed material layer of 3.2 g/cm$^3$ in density. The thickness of the sheet-shaped positive electrode was 70 μm. The sheet-shaped positive electrode was cut to 4.8 cm in width and 50 cm in length to obtain a positive electrode for a lithium ion secondary battery.

<Production of Negative Electrode for Lithium Ion Secondary Battery>

A slurry composition for a negative electrode was produced by stirring a mixture of 90 parts of spherical artificial graphite (volume-average particle diameter: 12 μm) and 10 parts of SiO$_x$ (volume-average particle diameter: 10 μm) as a negative electrode active material, 1 part of a styrene butadiene polymer as a binder, 1 part of carboxymethyl cellulose as a thickener, and an appropriate amount of water as a dispersion medium in a planetary mixer.

Next, copper foil of 15 μm in thickness was prepared as a current collector. The slurry composition for a negative electrode described above was applied onto both sides of the copper foil such as to have a coating weight after drying of 10 mg/cm' at each side and was dried at 60° C. for 20 minutes and at 120° C. for 20 minutes. Thereafter, 2 hours of heat treatment was performed at 150° C. to obtain a negative electrode web. The negative electrode web was rolled by roll pressing to produce a sheet-shaped negative electrode including the copper foil and negative electrode mixed material layers (both sides) of 1.8 g/cm$^3$ in density. The sheet-shaped negative electrode was cut to 5.0 cm in width and 52 cm in length to obtain a negative electrode for a lithium ion secondary battery.

<Preparation of Separator>

A separator made of a single layer of polypropylene (produced by Celgard, LLC.; product name: Celgard 2500; microporous membrane made of polypropylene of 15 μm in thickness) was cut out as 120 cm×5.5 cm.

<Production of Lithium Ion Secondary Battery>

The positive electrode and negative electrode described above were wound using a core of 20 mm in diameter with the separator described above interposed therebetween so as to obtain a roll. The obtained roll was compressed to a thickness of 4.5 mm from one direction at a rate of 10 mm/s. Note that the compressed roll had an elliptical shape in plan view, and the ratio of the major axis to the minor axis thereof (major axis/minor axis) was 7.7.

In addition, an electrolyte solution was prepared (chemical composition: LiPF$_6$ solution of 1.0 M in concentration (solvent: mixed solution obtained by adding 5 mass % of fluoroethylene carbonate to a mixed solvent of ethylene carbonate/ethyl methyl carbonate=3/7 (mass ratio); additive: 2 volume % of vinylene carbonate)).

The compressed roll was subsequently housed in an aluminum laminate case together with 3.2 g of the non-aqueous electrolyte solution. After connecting a nickel lead to a specific location on the negative electrode and connecting an aluminum lead to a specific location on the positive electrode, an opening of the case was heat sealed to obtain a lithium ion secondary battery. This lithium ion secondary battery was a pouch shape of a specific size capable of housing the roll and had a battery nominal capacity of 700 mAh. Resistance and high-temperature cycle characteristics were evaluated for the obtained lithium ion secondary battery as previously described. The results are shown in Table 1.

Example 2

Various operations, measurements, and evaluations were performed in the same way as in Example 1 with the exception that the positive electrode active material used in production of the slurry composition for a secondary battery positive electrode was changed to lithium-containing cobalt oxide (LiCoO$_2$). The results are shown in Table 1.

Example 3

Various operations, measurements, and evaluations were performed in the same way as in Example 1 with the exception that the conductive material used in production of the conductive material paste composition was changed to 2 parts of acetylene black (DENKA BLACK® (DENKA BLACK is a registered trademark in Japan, other countries, or both) produced by Denka Company Limited; powdered product; BET specific surface area: 70 m$^2$/g). The results are shown in Table 1.

Note that the conductive material paste composition produced as a measurement sample in evaluation of conductive material dispersion uniformity in this example had a solid content concentration of 18%.

Examples 4 to 6

Various operations, measurements, and evaluations were performed in the same way as in Example 1 with the exception that a condition (additive amount of ion exchange resin) in contacting with the strong base anion exchange resin in production of the polymer A was changed such that the pH of the extract of the polymer A was as indicated in Table 1. The results are shown in Table 1.

Examples 7 and 8

Various operations, measurements, and evaluations were performed in the same way as in Example 1 with the exception that the amount of the polymer A used in production of the conductive material paste composition was changed as indicated in Table 1. The results are shown in Table 1.

Examples 9 and 10

Various operations, measurements, and evaluations were performed in the same way as in Example 1 with the exception that a condition (palladium content relative to mass of solid content contained in water dispersion of precursor of polymer A) of the hydrogenation reaction in production of the polymer A was changed such that the iodine value of the polymer A was as indicated in Table 1. The results are shown in Table 1.

Examples 11 to 14 and 18

Various operations, measurements, and evaluations were performed in the same way as in Example 1 with the exception that the amounts of monomers used in production of the polymer A were changed such that the proportion (mass %) constituted by each unit in the obtained polymer A was as indicated in Table 1. The results are shown in Table 1.

Example 15

Various operations, measurements, and evaluations were performed in the same way as in Example 1 with the exception that the binder compounded in production of the slurry composition for a secondary battery positive electrode was changed to polyacrylonitrile (PAN). The results are shown in Table 1.

Example 16

The hydrogenation method in production of the polymer A was changed as described below. The water dispersion of the precursor (particulate polymer) of the polymer A was adjusted to a total solid content concentration of 12 mass % and then 400 mL (total solid content: 48 g) thereof was loaded into a 1 L autoclave equipped with a stirrer. Nitrogen gas was passed therethrough for 10 minutes to remove dissolved oxygen in the water dispersion. Meanwhile, 75 mg of palladium acetate as a hydrogenation catalyst was dissolved in 180 mL of water to which an equimolar amount of nitric acid and 4 molar equivalents of hydrochloric acid relative to Pd had been added so as to prepare a hydrogenation catalyst solution. The obtained hydrogenation catalyst solution was added into the aforementioned autoclave. The system was purged twice with hydrogen gas, the contents of the autoclave were subsequently heated to 50° C. in a state in which the pressure was raised to 3 MPa with hydrogen gas, and a hydrogenation reaction (referred to as a "first stage hydrogenation reaction") was performed for 6 hours. At this point, the iodine value of the polymer was 35 g/100 g. Next, the autoclave was restored to atmospheric pressure, and a solution obtained by dissolving 25 mg of palladium acetate in 60 mL of water to which an equimolar amount of nitric acid and 4 molar equivalents of hydrochloric acid relative to Pd had been added was further added into the autoclave as a hydrogenation catalyst solution. The system was purged twice with hydrogen gas, the contents of the autoclave were subsequently heated to 50° C. in a state in which the pressure was raised to 3 MPa with hydrogen gas, and a hydrogenation reaction (referred to as a "second stage hydrogenation reaction") was performed for 6 hours. With the exception of these points, various operations, measurements, and evaluations were performed in the same way as in Example 1. The results are shown in Table 1.

Example 17

A polymer A was obtained using a hydrogenation catalyst solution having a different chemical composition to that in the hydrogenation method of Example 16. With the exception of this point, various operations, measurements, and evaluations were performed in the same way as in Example 1. The results are shown in Table 1. Note that the hydrogenation catalyst solution added in each of the first and second stage hydrogenation reactions was a solution obtained by dissolving 75 mg of palladium acetate in 180 mL of water to which 0.1 molar equivalents of nitric acid and 4 molar equivalents of hydrochloric acid relative to Pd had been added.

Comparative Examples 1 and 2

Various operations were performed in the same way as in Example 1 with the exception that a condition (additive amount of ion exchange resin) in contacting with the strong base anion exchange resin in production of the polymer A was changed such that the pH of the extract of the polymer A was as indicated in Table 1. However, it was not possible to produce a slurry composition for a secondary battery positive electrode that could form a positive electrode mixed material layer and it was not possible to perform evaluations using a secondary battery in Comparative Example 1.

In Comparative Example 2, various measurements and evaluations were performed in the same way as in Example 1 with the exception of the above. The results are shown in Table 1.

In Table 1:
"H-BD" indicates hydrogenated butadiene monomer unit (linear alkylene structural unit having carbon number of 4);
"BD" indicates 1,3-butadiene monomer unit;
"AN" indicates acrylonitrile monomer unit;
"ST" indicates styrene monomer unit;
"MAA" indicates methacrylic acid monomer unit;
"Tg" indicates glass-transition temperature;
"NMC532" indicates $Li(Ni_{0.5}Mn_{0.3}Co_{0.2})O_2$;
"LCO" indicates $LiCoO_2$;
"MWCNT" indicates multi-walled carbon nanotubes;
"AB" indicates acetylene black;
"NMP" indicates N-methyl-2-pyrrolidone;
"PVdF" indicates polyvinylidene fluoride; and
"PAN" indicates polyacrylonitrile.

TABLE 1

| | | | | Examples | | | | | | |
|---|---|---|---|---|---|---|---|---|---|---|
| | | | | 1 | 2 | 3 | 4 | 5 | 6 | 7 |
| Slurry composition | Positive electrode active material | | Type | NMC532 | LCO | NMC532 | NMC532 | NMC532 | NMC532 | NMC532 |
| | | | Amount (parts by mass) | 100 | 100 | 100 | 100 | 100 | 100 | 100 |
| | Conductive material paste composition | Conductive material | Type | MWCNT | MWCNT | AB | MWCNT | MWCNT | MWCNT | MWCNT |
| | | | Specific surface area ($m^2/g$) | 160 | 160 | 70 | 160 | 160 | 160 | 160 |

TABLE 1-continued

| | | | | | | | | | | |
|---|---|---|---|---|---|---|---|---|---|---|
| | | | Amount (parts by mass) | | 1 | 1 | 2 | 1 | 1 | 1 | 1 |
| | | Polymer A | Monomer units | H-BD, BD (mass %) | 35 | 35 | 35 | 35 | 35 | 35 | 35 |
| | | | | AN (mass %) | 23 | 23 | 23 | 23 | 23 | 23 | 23 |
| | | | | ST (mass %) | 38 | 38 | 38 | 38 | 38 | 38 | 38 |
| | | | | MAA (mass %) | 4 | 4 | 4 | 4 | 4 | 4 | 4 |
| | | | Extract pH (−) | | 9.0 | 9.0 | 9.0 | 6.0 | 7.0 | 10.0 | 9.0 |
| | | | Iodine value (g/100 g) | | 10 | 10 | 10 | 10 | 10 | 10 | 10 |
| | | | Nitric acid content (ppm) | | 0 | 0 | 0 | 0 | 0 | 0 | 0 |
| | | | Tg (° C.) | | 20 | 20 | 20 | 20 | 20 | 20 | 20 |
| | | | Amount (parts by mass) | | 0.2 | 0.2 | 0.2 | 0.2 | 0.2 | 0.2 | 0.08 |
| | | Organic solvent | Type | | NMP | NMP | NMP | NMP | NMP | NMP | NMP |
| | Binder | | Type | | PVdF | PVdF | PVdF | PVdF | PVdF | PVdF | PVdF |
| | | | Amount (parts by mass) | | 2 | 2 | 2 | 2 | 2 | 2 | 2 |
| | Organic solvent | | Type | | NMP | NMP | NMP | NMP | NMP | NMP | NMP |
| Evaluation | Conductive material dispersion uniformity | | | | A | A | A | C | B | A | B |
| | Resistance of secondary battery | | | | A | A | B | B | A | A | B |
| | High- temperature cycle characteristics of secondary battery | | | | A | A | A | B | B | A | A |

| | | | | | Examples | | | | | | |
|---|---|---|---|---|---|---|---|---|---|---|---|
| | | | | | 8 | 9 | 10 | 11 | 12 | 13 | 14 |
| Slurry composition | Positive electrode active material | | Type | | NMC532 | NMC532 | NMC532 | NMC532 | NMC532 | NMC532 | NMC532 |
| | | | Amount (parts by mass) | | 100 | 100 | 100 | 100 | 100 | 100 | 100 |
| | Conductive material paste composition | Conductive material | Type | | MWCNT | MWCNT | MWCNT | MWCNT | MWCNT | MWCNT | MWCNT |
| | | | Specific surface area (m²/g) | | 160 | 160 | 160 | 160 | 160 | 160 | 160 |
| | | | Amount (parts by mass) | | 1 | 1 | 1 | 1 | 1 | 1 | 1 |
| | | Polymer A | Monomer units | H-BD, BD (mass %) | 35 | 35 | 35 | 35 | 64 | 37 | 62 |
| | | | | AN (mass %) | 23 | 23 | 23 | 23 | 36 | 24 | 34 |
| | | | | ST (mass %) | 38 | 38 | 38 | 37 | 0 | 39 | 0 |
| | | | | MAA (mass %) | 4 | 4 | 4 | 5 | 0 | 0 | 4 |
| | | | Extract pH (−) | | 9.0 | 9.0 | 9.0 | 9.0 | 9.0 | 9.0 | 9.0 |
| | | | Iodine value (g/100 g) | | 10 | 35 | 50 | 10 | 10 | 10 | 10 |
| | | | Nitric acid content (ppm) | | 0 | 0 | 0 | 0 | 0 | 0 | 0 |
| | | | Tg (° C.) | | 20 | 20 | 20 | 20 | −23 | 17 | −21 |
| | | | Amount (parts by mass) | | 0.8 | 0.2 | 0.2 | 0.2 | 0.2 | 0.2 | 0.2 |
| | | Organic solvent | Type | | NMP | NMP | NMP | NMP | NMP | NMP | NMP |
| | Binder | | Type | | PVdF | PVdF | PVdF | PVdF | PVdF | PVdF | PVdF |
| | | | Amount (parts by mass) | | 2 | 2 | 2 | 2 | 2 | 2 | 2 |
| | Organic solvent | | Type | | NMP | NMP | NMP | NMP | NMP | NMP | NMP |
| Evaluation | Conductive material dispersion uniformity | | | | A | A | A | B | C | A | C |
| | Resistance of secondary battery | | | | B | A | A | A | B | A | B |
| | High- temperature cycle characteristics of secondary battery | | | | A | B | C | B | C | B | B |

| | | | | | Examples | | | | Comparative examples | |
|---|---|---|---|---|---|---|---|---|---|---|
| | | | | | 15 | 16 | 17 | 18 | 1 | 2 |
| Slurry composition | Positive electrode active material | | Type | | NMC532 | NMC532 | NMC532 | NMC532 | NMC532 | NMC532 |
| | | | Amount (parts by mass) | | 100 | 100 | 100 | 100 | 100 | 100 |

TABLE 1-continued

| | | | | | | | | | |
|---|---|---|---|---|---|---|---|---|---|
| | Conductive material paste composition | Conductive material | Type | MWCNT | MWCNT | MWCNT | MWCNT | MWCNT | MWCNT |
| | | | Specific surface area ($m^2$/g) | 160 | 160 | 160 | 160 | 160 | 160 |
| | | | Amount (parts by mass) | 1 | 1 | 1 | 1 | 1 | 1 |
| | | Polymer A | Monomer units | H-BD, BD (mass %) | 35 | 35 | 35 | 40 | 35 | 35 |
| | | | | AN (mass %) | 23 | 23 | 23 | 22 | 23 | 23 |
| | | | | ST (mass %) | 38 | 38 | 38 | 34 | 38 | 38 |
| | | | | MAA (mass %) | 4 | 4 | 4 | 4 | 4 | 4 |
| | | | Extract pH (−) | 9.0 | 9.0 | 9.0 | 9.0 | 3.0 | 5.0 |
| | | | Iodine value (g/100 g) | 10 | 10 | 10 | 10 | 10 | 10 |
| | | | Nitric acid content (ppm) | 0 | 5 | 50 | 0 | 0 | 0 |
| | | | Tg (° C.) | 20 | 20 | 20 | 12 | 20 | 20 |
| | | | Amount (parts by mass) | 0.2 | 0.2 | 0.2 | 0.2 | 0.2 | 0.2 |
| | | Organic solvent | Type | NMP | NMP | NMP | NMP | NMP | NMP |
| | Binder | | Type | PAN | PVdF | PVdF | PVdF | PVdF | PVdF |
| | | | Amount (parts by mass) | 2 | 2 | 2 | 2 | 2 | 2 |
| | Organic solvent | | Type | NMP | NMP | NMP | NMP | NMP | NMP |
| Evaluation | Conductive material dispersion uniformity | | | A | A | A | B | E | D |
| | Resistance of secondary battery | | | B | A | B | A | — | C |
| | High-temperature cycle characteristics of secondary battery | | | A | B | B | B | — | D |

It can be seen from Table 1 that in Examples 1 to 18 in which the used polymer A satisfied a specific chemical composition and had an extract pH of 5.5 or higher, it was possible to provide a binder composition for a secondary battery positive electrode that can increase conductive material dispersion uniformity when mixed with a conductive material. It can also be seen from Table 1 that in Comparative Examples 1 and 2 in which the used polymer A had an extract pH of lower than 5.5, it was not possible to provide a binder composition for a secondary battery positive electrode that can increase conductive material dispersion uniformity when mixed with a conductive material.

INDUSTRIAL APPLICABILITY

According to the present disclosure, a binder composition for a secondary battery positive electrode that can increase conductive material dispersion uniformity when mixed with a conductive material is obtained.

Moreover, according to the present disclosure, a conductive material paste composition for a secondary battery positive electrode and a slurry composition for a secondary battery positive electrode that have excellent conductive material dispersion uniformity are obtained.

Furthermore, according to the present disclosure, a positive electrode for a secondary battery that can form a secondary battery having excellent battery characteristics is obtained.

Also, according to the present disclosure, a secondary battery having excellent battery characteristics is obtained.

The invention claimed is:

1. A binder composition for a secondary battery positive electrode comprising a polymer, wherein
the polymer includes a nitrile group-containing monomer unit and a linear alkylene structural unit having a carbon number of 4 or more,
the polymer has a nitric acid content of 30 ppm or less by mass, and
when the polymer is subjected to an extraction, an extract of the polymer has a pH of 5.5 or higher, where the extraction is performed by preparing an 8 mass % N-methyl-2-pyrrolidone solution of the polymer, diluting the solution by a factor of 10 with deionized water, and extracting liquid encapsulated in the polymer by pressing the polymer.

2. The binder composition for a secondary battery positive electrode according to claim 1, wherein the polymer has an iodine value of not less than 3 g/100 g and not more than 60 g/100 g.

3. The binder composition for a secondary battery positive electrode according to claim 1, wherein the polymer further includes an aromatic vinyl monomer unit.

4. The binder composition for a secondary battery positive electrode according to claim 1, wherein the polymer further includes a hydrophilic group-containing monomer unit.

5. The binder composition for a secondary battery positive electrode according to claim 1, wherein the polymer has a glass-transition temperature of higher than 15° C.

6. A conductive material paste composition for a secondary battery positive electrode comprising: a conductive material; an organic solvent; and the binder composition for a secondary battery positive electrode according to claim 1.

7. A slurry composition for a secondary battery positive electrode comprising: a positive electrode active material; a conductive material; an organic solvent; and the binder composition for a secondary battery positive electrode according to claim 1.

8. A positive electrode for a secondary battery comprising a positive electrode mixed material layer formed using the slurry composition for a secondary battery positive electrode according to claim 7 on a current collector.

9. A method of producing a positive electrode for a secondary battery comprising a step of applying the slurry composition for a secondary battery positive electrode according to claim 7 onto at least one side of a current collector and drying the slurry composition for a secondary battery positive electrode to form a positive electrode mixed material layer.

10. A secondary battery comprising a positive electrode, a negative electrode, a separator, and an electrolyte solution, wherein the positive electrode is the positive electrode for a secondary battery according to claim 8.

\* \* \* \* \*